(12) United States Patent
Stoewer et al.

(10) Patent No.: US 6,237,210 B1
(45) Date of Patent: May 29, 2001

(54) METHOD AND SYSTEM FOR FABRICATING, EQUIPPING AND OUTFITTING AN AIRCRAFT FUSELAGE

(75) Inventors: Udo Stoewer, Bremen; Bernd Koehler, Neu Wulmstorf; Norbert Kosuch, Rosengarten-Sottorf, all of (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/366,034

(22) Filed: Aug. 2, 1999

(30) Foreign Application Priority Data

Jul. 31, 1998 (DE) .............................. 198 34 703

(51) Int. Cl.⁷ ........................... B21D 39/03; B23P 19/00; B23P 11/00
(52) U.S. Cl. ................. 29/430; 29/791; 29/431; 29/243.53
(58) Field of Search .......... 29/429, 430, 897.2, 29/431, 525.06, 791, 795, 243.53, 428, 897, 701, 824

(56) References Cited

U.S. PATENT DOCUMENTS

| | | | |
|---|---|---|---|
| 2,383,225 | * | 8/1945 | Sorensen et al. ............ 29/430 |
| 2,391,510 | * | 12/1945 | Pioch et al. ................ 29/824 |

(List continued on next page.)

FOREIGN PATENT DOCUMENTS

| | | |
|---|---|---|
| 3232093 | 3/1984 | (DE) . |
| 3438584 | 5/1985 | (DE) . |
| 3535761 | 3/1987 | (DE) . |
| 3715927 | 12/1988 | (DE) . |

OTHER PUBLICATIONS

Brochure entitled ARAS Survey of the complete range of ARAS Systems in Aircraft Production, AFS ARAS System, Bellevue, WA, pp. 1–7.
FASTEC '85; Conference Proceedings, Oct. 8–11, 1984, Atlanta, Georgia, by Lennart Gidlund, pp.1–14.

*Primary Examiner*—S. Thomas Hughes
*Assistant Examiner*—Marc Jimenez
(74) *Attorney, Agent, or Firm*—W. F. Fasse; W. G. Fasse

(57) ABSTRACT

A fuselage is substantially simultaneously fabricated, equipped and outfitted in an assembly area including adjacent riveting, equipping and outfitting zones. The riveting zone includes an external riveting apparatus working from the outside of the aircraft fuselage, and an internal riveting apparatus working from the inside of the fuselage to fabricate and join a first fuselage section to an initial structure. The first fuselage section is moved from the riveting zone into an equipping zone, wherein equipment, such as pipes, ducts, hoses, pumps, blowers and structural components and fittings of the aircraft, is installed in the first fuselage section, while simultaneously a second fuselage section is being rivet-joined onto the first fuselage section in the riveting zone. The second fuselage section is moved from the riveting zone into the equipping zone, and the first fuselage section is moved from the equipping zone into the outfitting zone. Equipment is installed in the second fuselage section in the equipping zone, while outfitting components such as electrical cable bundles, insulation blankets, wall paneling, floors, furnishings, and cabin fittings are installed in the first fuselage section in the outfitting zone. Next, the fuselage being formed is shifted so that the second fuselage section moves from the equipping zone into the outfitting zone, while a third fuselage section is joined onto the second fuselage section in the riveting zone.

24 Claims, 2 Drawing Sheets

U.S. PATENT DOCUMENTS

| | | | | |
|---|---|---|---|---|
| 3,802,629 | * | 4/1974 | Flanagan | 241/14 |
| 4,548,345 | | 10/1985 | Puritz et al. . | |
| 4,637,761 | | 1/1987 | Murray et al. . | |
| 4,662,556 | * | 5/1987 | Gidlund | 29/703 |
| 4,662,566 | | 5/1987 | Gidlund . | |
| 4,762,261 | | 8/1988 | Hawly . | |
| 4,821,408 | * | 4/1989 | Speller, Sr. et al. | 29/701 |
| 4,854,491 | * | 8/1989 | Stoewer | 29/243.54 |
| 4,885,836 | * | 12/1989 | Bonomi et al. | 29/243.53 |
| 4,967,947 | * | 11/1990 | Sarh | 227/52 |
| 5,033,014 | * | 7/1991 | Carver et al. | 703/1 |
| 5,119,854 | * | 6/1992 | Chanoine et al. | 144/1.1 |
| 5,509,759 | * | 4/1996 | Keesling | 405/232 |
| 5,560,102 | * | 10/1996 | Micale et al. | 29/897.2 |
| 5,586,391 | * | 12/1996 | Micale | 29/897.2 |
| 5,615,483 | * | 4/1997 | Micale et al. | 29/897.2 |
| 5,666,782 | * | 9/1997 | Prospero et al. | 29/430 |
| 5,690,317 | * | 11/1997 | Sandsborg | 256/1 |
| 5,694,690 | * | 12/1997 | Micale | 29/243.53 |
| 5,727,301 | * | 3/1998 | Kugo | 29/430 |
| 5,896,637 | * | 4/1999 | Sarh | 29/897.2 |
| 6,029,352 | * | 2/2000 | Nelson | 29/897.2 |
| 6,073,326 | | 6/2000 | Banks et al. . | |
| 6,088,897 | * | 7/2000 | Banks et al. | 29/243.53 |
| 6,098,260 | | 8/2000 | Sarh . | |

* cited by examiner

METHOD AND SYSTEM FOR FABRICATING, EQUIPPING AND OUTFITTING AN AIRCRAFT FUSELAGE

PRIORITY CLAIM

This application is based on and claims the priority under 35 U.S.C. §119 of German Patent Application 198 34 703.0, filed on Jul. 31, 1998, the entire disclosure of which is incorporated herein by reference.

FIELD OF THE INVENTION

The invention relates to a method for fabricating an aircraft fuselage from plural fuselage sections, equipping the fuselage and outfitting the fuselage, as well as a system for carrying out this method.

BACKGROUND INFORMATION

In present day manufacturing of aircraft fuselages, it has been typical to carry out the fabrication of the fuselage shell, the equipping of that fuselage shell, and the final outfitting or interior furnishing of that fuselage shell in separate distinct stages carried out in succession after the previous stage has been completed for the entire fuselage.

To carry out the fabricating stage, it is typical to first join together large surface area curved fuselage shell components by means of riveting to form fuselage sections, for example using riveting equipment disclosed in German Patent Laying Open Document 34 38 584 and corresponding U.S. Pat. No. 4,662,556 (Gidlund), the disclosure of which is incorporated herein by reference. The resulting fuselage sections are then typically joined to each other along transverse or circumferential seams to form larger aircraft fuselage segments, using both automatic riveting systems as well as manual operations.

After the aircraft fuselage, or at least a relatively large fuselage segment, has been assembled from plural fuselage sections, the entire resulting fuselage shell is transferred to at least another assembly station or area for carrying out the equipping of the entire fuselage shell, and thereafter the entire fuselage shell is transferred to at least a further assembly station or area for carrying out the outfitting of the entire fuselage shell. In this context, the equipping of the fuselage shell involves installing various aircraft systems components and equipment such as pipes, conduits, ducts, auxiliary devices and equipment, and structural components in the raw fuselage shell. The outfitting stage involves the installation of various outfitting components such as insulation packets or blankets, electrical conductor bundles, floors, wall paneling, furnishings including seats and baggage compartments for example, fittings and various finish and trim components.

It is apparent from the above discussion that the production cycle for manufacturing a finished aircraft fuselage involves plural independent and successive stages of fabrication, assembly and installation operations carried out sequentially one after the other for the entire aircraft fuselage. Especially due to the extraordinary size of a modern day commercial aircraft fuselage, such a conventional fabrication and assembly process is rather space intensive and time intensive and therefore costly. Assembly areas including the necessary support arrangements and the like require a large capital investment and also require a rather large and expensive building to enclose the large working space including the several successive assembly and installation areas or stages. The conventional step-by-step assembly and installation process, in which prescribed production steps or stages are carried out at a given assembly area and thereafter the aircraft fuselage is moved to the next assembly area for carrying out the successive assembly or installation stages, suffers another disadvantage, in that the entire production cycle will be affected by a problem causing a delay at any one of the successive assembly areas. As a result, any problem in any stage of the fabrication or installation process can lead to production standstills or delays of the entire production process.

SUMMARY OF THE INVENTION

In view of the above it is an object of the invention to provide an optimized production process for manufacturing an aircraft fuselage in which the time and space required for fabricating, equipping, and outfitting the fuselage shell is reduced in comparison to the conventional stage-by-stage process. It is a further object of the invention to provide an apparatus or system for carrying out such a method. The invention also aims to avoid or overcome the disadvantages of the prior art, and to achieve additional advantages, as apparent from the present specification.

The above objects have been achieved according to the invention in a method for fabricating, equipping and outfitting an aircraft fuselage in which an assembly area for assembling a single fuselage shell includes a riveting zone, an equipping zone, and an outfitting zone, wherein the following steps are carried out. A first fuselage section is moved into the riveting zone, in which the first fuselage section is then joined by riveting to an initial structure such as a fuselage tail piece or the like. Next, the first fuselage section is moved out of the riveting zone and into an equipping zone, while a second fuselage section is moved into the riveting zone. Equipment components are installed in the first fuselage section in the equipping zone, while simultaneously the second fuselage section in the riveting zone is joined by riveting to the first fuselage section. Next, the connected fuselage sections are moved together or in common, so that the second fuselage section is moved out of the riveting zone into the equipping zone while simultaneously the first fuselage section is moved from the equipping zone into the outfitting zone. Also, a third fuselage section is moved into the riveting zone. Then, simultaneously, outfitting components are installed in the first, already equipped, fuselage section in the outfitting zone, and equipment components are installed in the second fuselage section in the equipping zone, and the third fuselage section is joined by riveting to the second fuselage section in the riveting zone. The above steps are repeated while successively shifting the resulting fuselage segment "downstream" section-by-section from the riveting zone to the equipping zone and then to the outfitting zone, until the entire fuselage or the desired segment thereof has been fabricated, equipped, and outfitted.

According to the inventive method, the total amount of assembly space for completely fabricating, equipping and outfitting an aircraft fuselage is substantially reduced in comparison to the prior art. Namely, according to the invention, the entire process can be carried out in an assembly area such as a fabrication hall that is only large enough to accommodate one complete fuselage therein, while the conventional stage-by-stage method required an assembly area at least three times as large, namely a first area to completely assemble the fuselage, a second area to completely equip the fuselage, and a third area to completely outfit the fuselage. Furthermore, since the several fabricating, equipping and outfitting operations are carried out substantially simultaneously or at least overlapping in time, according to the invention, the total production time and therewith the total throughput time for the production of a single aircraft fuselage is substantially reduced.

The above objects have further been achieved according to the invention in a system or apparatus for carrying out the above mentioned method. The system comprises an aircraft assembly area such as a fabrication hall which essentially includes three successive adjacent production zones, wherein the first zone is a riveting zone including riveting equipment, the second zone is an equipping zone, and the third zone is an outfitting zone. Each one of the zones preferably has a size substantially corresponding to a single fuselage section as defined by successive transverse seams of the fuselage. Alternatively, a prescribed multiple of fuselage sections can be accommodated in each zone. For example, two fuselage sections joined along a transverse seam might be accommodated in each zone and processed or treated as a single fuselage section in the method of the invention. In order to prevent the work being performed in the equipping and outfitting zones from being damaged or influenced, or the workers from being injured, by the work being performed in the riveting zone, appropriate shielding or safety dividers are preferably arranged between the riveting zone and the equipping zone.

BRIEF DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
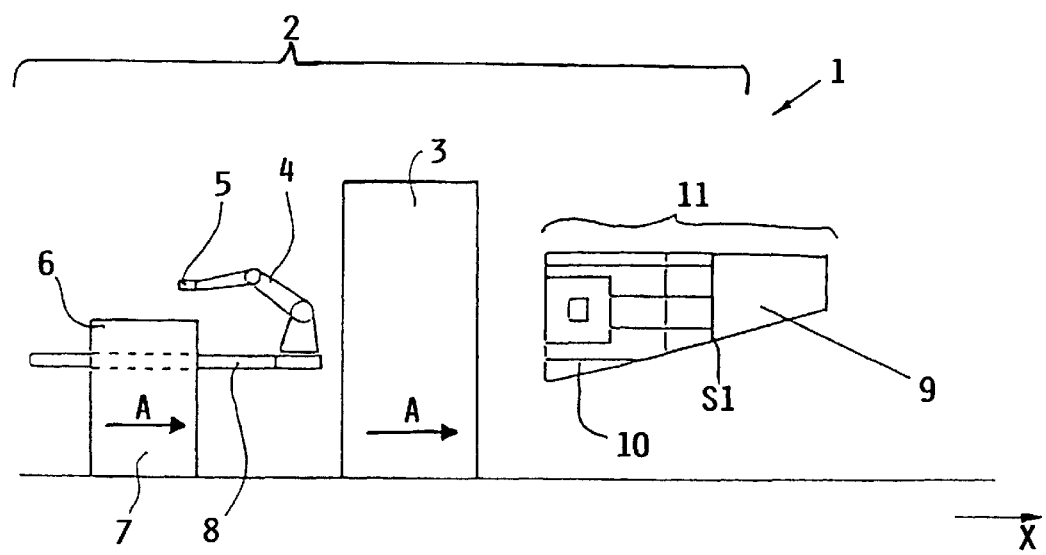
FIG. 1 is a schematic side view of an aircraft fuselage assembly area including riveting equipment in a riveting zone.

FIG. 1 shows an assembly area 1 such as the work floor of a fabrication hall or the like, in which the fabrication and assembly of an aircraft fuselage is carried out. In the assembly area 1 according to the invention, it is possible to fabricate or assemble, equip and outfit an aircraft fuselage in such a manner so that these distinct operations can be carried out almost simultaneously. To achieve this, the assembly area 1 is essentially divided into three zones, namely a riveting zone 2, an equipping zone 12, and an outfitting zone 14, of which only the riveting zone 2 is shown in FIG. 1.

The riveting zone 2 includes the necessary equipment for carrying out a riveting operation to join together fuselage sections into larger fuselage segments or an entire fuselage shell, and optionally also to assemble the fuselage sections from separate components in the first place. Namely, the riveting zone 2 essentially comprises an orbital riveting apparatus 3 that surrounds and works from the outside of the fuselage, and a riveting robot 4 that extends into and works from the inside of the fuselage.

The orbital riveting apparatus 3 comprises an automatic riveting machine that is movably arranged on an annular or ring-shaped machine guide that is arranged to extend around the outside perimeter of the aircraft fuselage. The orbital riveting apparatus 3 is able to carry out the automatic riveting for joining aircraft fuselage components to each other along transverse or circumferential seams and lengthwise or longitudinal seams of the fuselage. Specifically, the automatic riveting machine forming the major working component of the orbital riveting apparatus 3 can form and prepare the necessary rivet holes, supply and insert rivets into the holes, and complete the fastening or closing of the rivets.

On the other hand, the riveting robot 4 carries a closing head tool 5 on the interior of the fuselage to cooperate with the automatic riveting machine on opposite sides of the rivet or fastener element that is being riveted. The riveting robot 4 is supported on a mounting frame 6 which essentially comprises a support arm stand 7 and a support arm 8. More particularly, the riveting robot 4 is arranged on the free end of the support arm 8. The support arm 8 is supported in a guide provided on the support arm stand 7, so as to be rotatable and linearly movable in a direction parallel to the aircraft lengthwise axis, i.e. the X-axis. The riveting robot 4 itself is controllably movable in a multi-axis manner. The riveting robot 4 and the mounting frame 6 are connected to a computerized control unit which provides computer generated control data to cooperatively move the mounting frame 6 and the riveting robot 4 so as to move the riveting tool mounted on the robot 4 to any required riveting location within the aircraft fuselage. The above mentioned closing head tool 5 provided on the riveting robot 4 is preferably exchangeable or replaceable with other tools for carrying out additional steps in a riveting operation or for closing or securing different types of rivet fasteners. For example, a riveting machine as disclosed in German Patent Publication 32 32 093 and corresponding U.S. Pat. No. 4,548,345 (Puritz et al.) can be mounted on the riveting robot 4.

FIG. 1 further shows an initial structure 9 such as a previously assembled aircraft tailcone or tail section, as well as a first fuselage section 10 that is to be joined to the initial structure 9 by riveting, along a transverse seam S1. This is carried out by the orbital riveting apparatus 3 and the riveting robot 4 cooperating with each other in the riveting zone 2 of the aircraft assembly area 1. FIG. 1 shows the first fuselage section 10 having been moved into the working range of the riveting zone 2, but the riveting apparatus 3 and robot 4 retracted toward the left and not in a position ready to carry out the riveting. Next, the riveting apparatus 3 and robot 4 will be moved to the right as shown by arrows A to begin the riveting work on the first fuselage section as shown in FIG. 2.

Figure 2:
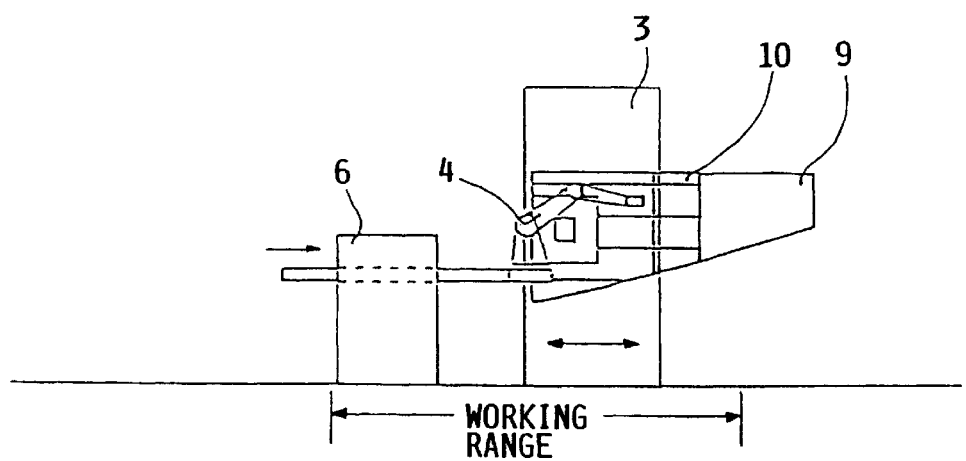
FIG. 2 is a view similar to FIG. 1, but shows the riveting operation being carried out by the riveting equipment within the working range of the riveting zone.

FIG. 2 illustrates the riveting operation being carried out to permanently join the first fuselage section 10 onto the initial structure 9, so as to thereby assemble the aircraft fuselage part or segment 11, as follows. The first fuselage section 10 is positioned in the riveting zone 2 in the working range of the riveting robot 4 and the orbital riveting apparatus 3, and the initial structure 9 such as the tailcone 9 is arranged adjoining and clamped or otherwise held to the first fuselage section 10 along the first transverse seam S1. The robot 4 and the riveting apparatus 3 are controlled and coordinated by a computer control unit.

At this time, the fuselage section 10 may be a previously assembled fuselage section, i.e. which has been previously riveted together from individual fuselage components along lengthwise seams, for example according to German Patent Laying Open Publication 34 38 584 and corresponding U.S. Pat. No. 4,662,556. In this case, the pre-assembled fuselage section is simply riveted to the initial structure 9 along the transverse seam S1 in the riveting zone 2.

As an alternative, the fuselage section 10 itself first needs to be assembled from a plurality of individual fuselage components along lengthwise seams and also joined to the initial structure 9 along the transverse seam S1. The individual fuselage components are clamped or otherwise tacked or temporarily connected to each other into the proper configuration of the fuselage shell, i.e. the proper configuration of the respective fuselage section 10, and are held in this configuration in the riveting zone 2. The fuselage components are then riveted to each other automatically along the lengthwise seams to form the fuselage section 10, and also are riveted to the initial structure 9 along the transverse seam S1 by the cooperative working steps of the riveting robot 4 and the orbital riveting apparatus 3 in the riveting zone 2.

Figure 3:
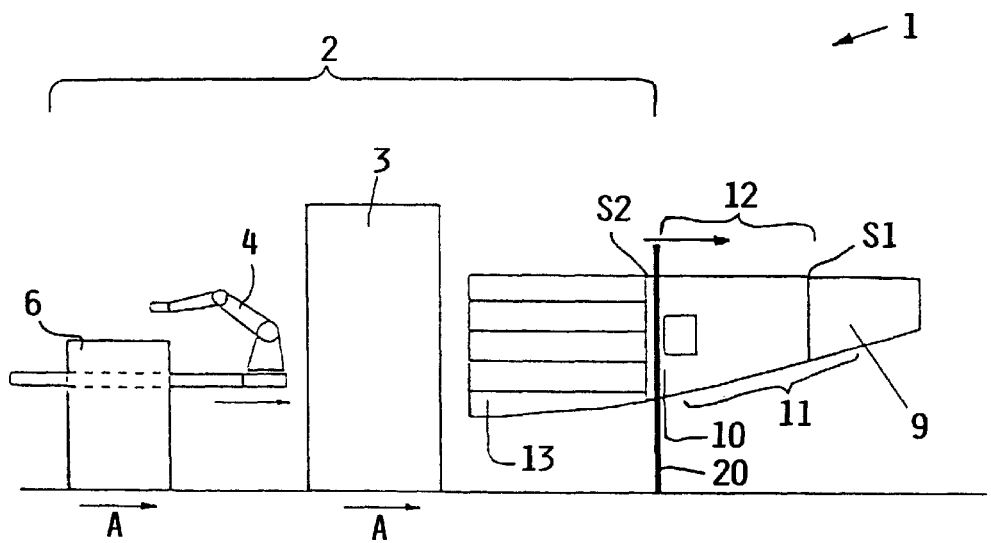
FIG. 3 is another schematic side view of the assembly area according to FIG. 1 in which the fuselage being assembled has been moved into a further equipping zone.

FIG. 3 shows a subsequent stage of the process after that shown in FIGS. 1 and 2. Namely, FIG. 3 shows the equipping zone 12 of the aircraft assembly area 1, next to the riveting zone 2. After the above mentioned aircraft fuselage segment 11 was assembled by fabricating the first fuselage section 10 and rivet-joining this fuselage section 10 onto the initial structure 9 as shown in FIGS. 1 and 2, the fuselage segment 11 is moved toward the right in the X-direction so that the first fuselage section 10 is moved out of the riveting zone 2 and into the equipping zone 12. In the equipping zone 12, various equipment components are installed in the previously fabricated aircraft fuselage segment 10. These equipment components are structural components, aircraft system components, and devices that are typically installed first in the raw fabricated fuselage shell. For example, such equipment components include pipes, ducts, conduits and hoses for the hydraulic systems, the water supply system, the air conditioning system, the emergency oxygen supply system, as well as pumps, blowers and the like associated with these systems, and further structural components of the air frame and its fittings.

Simultaneously or overlapping in time with the above equipping steps taking place in the equipping zone 12, a second fuselage section 13 is being fabricated and rivet-joined to the fuselage section 11 along a second transverse seam S2 in the riveting zone 2. Namely, similar riveting operations are carried out by the riveting robot 4 and the orbital riveting apparatus 3 in the riveting zone 2 in connection with the second fuselage section 13 as were described above in a preceding process stage in connection with the first fuselage section 10. In one embodiment, a previously fabricated second fuselage section 13 is merely rivet-joined to the first fuselage section 10 along the transverse seam S2. In a second embodiment, individual fuselage components are tacked or clamped together in the proper configuration and are then rivet-joined along lengthwise seams to form the fuselage section 13, which is further rivet-joined to the fuselage section 10 along the transverse seam S2.

Note that the arrangement shown in FIG. 3 in connection with the second fuselage section 13 corresponds to that shown in FIG. 1 in connection with the first fuselage section 10. Namely, the respective fuselage section is held or supported by any appropriate supporting jig or frame (not shown) within the working range of the riveting zone 2, but the riveting equipment including the orbital riveting apparatus 3 and the riveting robot 4 on the mounting frame 6, has not yet been moved into a working position. The working position of the riveting equipment in the working range of the riveting zone 2 is shown in FIG. 2. FIG. 3 merely indicates that the orbital riveting apparatus 3 and the riveting robot 4 mounted on the mounting frame 6 are moved toward the right in the direction of arrows A in order to carry out the riveting operation on the second fuselage section 13 as described above.

FIG. 3 further shows a dividing wall or screen 20 that is preferably arranged both outside and inside of the aircraft fuselage being fabricated. This dividing wall or screen is arranged between the riveting zone 2 and the equipping zone 12 in order to allow the equipping procedures to be carried out in the first fuselage section 10 simultaneously while the automatic riveting operations are being carried out in the second fuselage section 13. This wall or screen 20 or separate plural safety elements provide the required degree of worker safety and also ensure that the automatic riveting operations being carried out in the second fuselage section 13 do not damage or interfere with the equipping operations being carried out simultaneously in the first fuselage section 10. Especially, the shielding or screening provided by the wall or screen 20 ensures that workers or other personnel do not accidentally come into the working range of the automatic orbital riveting apparatus 3 and the automatic riveting robot 4. The wall may comprise a supported metal plate or wire mesh screen, or even suitable plastic divider panels.

Figure 4:
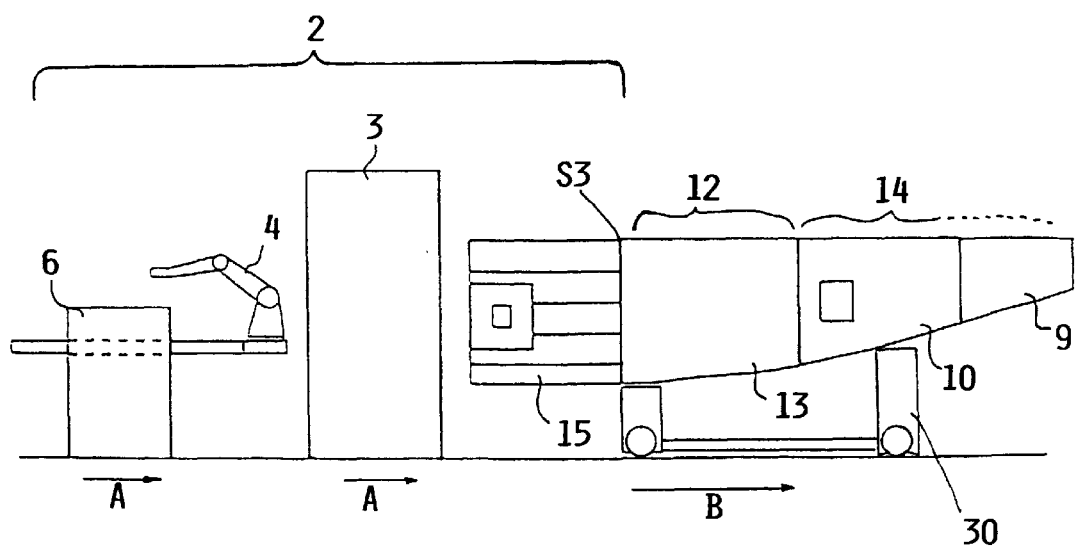
FIG. 4 corresponds to the view of FIG. 3, but further shows a final outfitting zone in addition to the riveting zone and the equipping zone.

FIG. 4 shows a further subsequent step of the method of fabricating, equipping, and outfitting the aircraft fuselage. Namely, FIG. 4 shows the outfitting zone 14 to the right adjacent to the equipping zone 12. The aircraft fuselage being formed has been moved to the right by one working step distance as shown by the arrow B, for example carried on a carriage 30 that is merely schematically shown. Thereby, the first fuselage section 10 has been moved from the equipping zone 12 into the outfitting zone 14, while the second fuselage section 13 has been moved from the riveting zone 2 into the equipping zone 12. At this stage, the first fuselage section 10 has previously been riveted or fabricated, and equipped, and is ready to be outfitted in the outfitting zone 14, while the second fuselage section 13 has been previously riveted or fabricated and is ready to be equipped in the equipping zone 12.

In the outfitting zone 14, various outfitting components such as insulation packets or blankets, electrical conductor bundles, floors, wall paneling, furnishings, aircraft cabin components, and fittings, as well as various finish components for the interior of the cabin are installed in the respective fuselage section, here the first fuselage section 10. It should be noted that all of the outfitting required for completely finishing the interior of the cabin of the aircraft is not necessarily carried out in the present working cycle entirely within the illustrated outfitting zone 14. Rather, individual components or particular work steps may be carried out separately at a later time. This depends on the work flow organization as well as the necessary assembly, equipping and outfitting procedures that are to be carried out. For example, a sensible variation of the process is to separately install any components that extend along or span more than one of the fuselage sections. In this context, it can be considered that the outfitting zone 14 extends with an unlimited or unspecified length toward the right, whereby outfitting procedures can be continued as additional sections are added onto the ever-growing fuselage and the resulting fuselage is moved stepwise toward the right.

Parallel to the outfitting steps being carried out on the first fuselage section 10 in the outfitting zone 14, the above described equipping steps of installing equipment components are being carried out in the second fuselage section 13 located in the equipping zone 12. Simultaneously, in the riveting zone 2, a third fuselage section 15 is fabricated and joined by riveting to the second fuselage section 13. Just as in the preceding steps described above, the third fuselage section 15 may be a pre-fabricated fuselage section that merely needs to be riveted to the second fuselage section 13 along a third transverse seam S3, or may be fabricated in the riveting zone 2 by riveting together individual fuselage components along lengthwise seams and also riveting the fuselage section to the adjoining section along the transverse seam. Note that the FIGS. 1 to 4 illustrate the respective fuselage sections, first showing the lengthwise seams or stringers extending between vertical frame members in the riveting zone 2, and in subsequent stages (i.e. zones 12 and 14) showing the respective fuselage sections as closed or solid members, indicating the outer fuselage skin covering the outside of the fuselage section.

The above described parallel, simultaneous or at least overlapping manufacturing steps achieve a substantial time advantage for the overall manufacturing process for fabricating, equipping and outfitting an aircraft fuselage. Namely, while a respective section of the aircraft fuselage is being assembled or fabricated in one zone, the installation of further necessary components can already be carried out simultaneously in another fuselage section located in another zone. It is especially advantageous that this reduction in the total manufacturing time results in a reduction in the through-flow time or transit time for a single aircraft fuselage to pass entirely through the manufacturing process. This is especially true in the context of the assembly of a commercial aircraft, which in total consists of a plurality of many individual parts that must all be assembled or installed to complete the aircraft.

The above described steps carried out in the respective zones are repeated as often as necessary, namely once for each fuselage section, until the required number of fuselage sections have been fabricated, joined to each other, equipped and outfitted to manufacture the required total length of the fuselage segment or even a total fuselage. In this context, it should be understood that a fuselage stepping movement from one zone to the next can be carried out corresponding to each individual fuselage section joined along a transverse seam, or one of these work step movements can be carried out after two fuselage sections have been joined together along respective transverse seams, or so on. The particulars depend on the respective length of each individual fuselage section, and the working zone size required for carrying out the equipping and outfitting steps within the fuselage being fabricated.

This method can be used for manufacturing an entire aircraft fuselage starting from the tailcone and extending all the way up to a cockpit section, or starting from a cockpit section and continuing to the tailcone. Alternatively, the method can be used to manufacture only a prescribed segment of the fuselage, for example the straight substantially cylindrical portion of the fuselage. In such a case when only the straight portion of the aircraft fuselage is manufactured according to the present method, with a subsequent assembly or joining of a cockpit section and a tail section, it is especially easy for workers to access the fuselage segment being manufactured, and it is especially easy to supply materials, components, and equipment to the equipping zone 12 and the outfitting zone 14, because the terminal end of such a fuselage segment has a large open diameter which provides easy access. In any event, the general characterizing feature of the inventive method is that the several manufacturing stages can be carried out overlapping or simultaneously with one another, to allow a parallel execution of work steps. The system according to the invention comprises the necessary equipment and zones provided in an assembly area for carrying out the method, as described above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. In this specification, "substantially simultaneously" means overlapping in time so that one step is completed within the time of completing another, or that a predominant portion of two steps is carried out at the same time.

What is claimed is:

1. A method of fabricating, equipping and outfitting at least a segment of an aircraft fuselage including a plurality of fuselage sections, in an assembly area including a riveting zone having an automatic riveting machine, an equipping zone and an outfitting zone, said method comprising the following steps:
   a) moving a first fuselage section into said riveting zone, and joining said first fuselage section onto an initial structure using said automatic riveting machine;
   b) moving said first fuselage section and said initial structure in common so that said first fuselage section is moved from said riveting zone into said equipping zone;
   c) moving a second fuselage section into said riveting zone, and joining said second fuselage section onto said first fuselage section using said automatic riveting machine;
   d) at least partially overlapping in time with said step c), installing equipment components into said first fuselage section in said equipping zone;
   e) moving said first fuselage section and said second fuselage section in common so that said first fuselage section is moved from said equipping zone into said outfitting zone and said second fuselage section is moved from said riveting zone into said equipping zone;
   f) moving a third fuselage section into said riveting zone, and joining said third fuselage section onto said second fuselage section using said automatic riveting machine;
   g) at least partially overlapping in time with said step f), installing equipment components into said second fuselage section in said equipping zone and installing outfitting components into said first fuselage section in said outfitting zone; and
   h) moving said first, second and third fuselage sections in common so that said second fuselage section is moved from said equipping zone into said outfitting zone and said third fuselage section is moved from said riveting zone into said equipping zone.

2. The method according to claim 1, further comprising the following steps:
   i) moving a further fuselage section into said riveting zone, and joining said further fuselage section onto said fuselage section located in said equipping zone using said automatic riveting machine;
   j) at least partially overlapping in time with said step i), installing equipment components into said fuselage section located in said equipping zone and installing outfitting components into said fuselage section located in said outfitting zone;

k) moving said fuselage sections in common so that said fuselage section that was in said equipping zone is moved from said equipping zone into said outfitting zone and said fuselage section that was in said riveting zone is moved from said riveting zone into said equipping zone; and l) repeating said steps i), j) and k) in successive cycles using respective successive additional fuselage sections, for a sufficient number of cycles to form a complete fuselage or a fuselage segment having a required axial length.

3. The method according to claim 2, carried out so as to form said complete fuselage including a cockpit fuselage section and a tailcone fuselage section and a plurality of body fuselage sections joined therebetween, and wherein said initial structure comprises one of said cockpit fuselage section and said tailcone fuselage section.

4. The method according to claim 2, carried out so as to form said fuselage segment, which comprises a straight substantially cylindrical segment of an aircraft fuselage without at least one of a cockpit section and a tailcone section, and further comprising a subsequent step of joining said at least one of a cockpit section and a tailcone section to said fuselage segment.

5. The method according to claim 1, wherein each said fuselage section moved into said riveting zone has been previously fabricated, and said automatic riveting machine is used in said riveting zone only for respectively joining each said fuselage section located in said riveting zone respectively to said fuselage section located in said equipping zone by fastening rivets along a transverse circumferential seam between said fuselage sections being joined.

6. The method according to claim 1, wherein each said fuselage section moved into said riveting zone is an unassembled fuselage section comprising a plurality of fuselage components temporarily held together along longitudinal seams, and further comprising joining together said fuselage components along said longitudinal seams using said automatic riveting machine when each said fuselage section is located respectively in said riveting zone, and wherein said joining of each said fuselage section respectively in said riveting zone to said fuselage section respectively in said equipping zone comprises joining with rivets along a transverse circumferential seam using said automatic riveting machine.

7. The method according to claim 1, wherein said automatic riveting machine includes an orbital riveting apparatus and a riveting robot, and wherein said joining using said automatic riveting machine comprises moving said riveting robot inside of said fuselage section and moving said orbital riveting apparatus outside of said fuselage section in said riveting zone.

8. The method according to claim 1, wherein said equipment components comprise components selected from pipes, hoses, conduits, ducts, pumps, blowers, electrical devices, pneumatic devices, hydraulic devices, airframe structural components, and cabin structural components.

9. The method according to claim 8, wherein said outfitting components comprise components selected from insulation blankets, insulation packets, electrical conductors and cables, wall panels, floor decks, mounting hardware and fittings, trim components, seats, baggage compartments, and light fixtures.

10. The method according to claim 1, wherein said outfitting components comprise components selected from insulation blankets, insulation packets, electrical conductors and cables, wall panels, floor decks, mounting hardware and fittings, trim components, seats, baggage compartments, and light fixtures.

11. The method according to claim 1, wherein said outfitting components are different components from said equipment components.

12. The method according to claim 1, further comprising arranging a safety screening divider between said riveting zone and said equipping zone before said step of installing said equipment components in said fuselage section in said equipping zone.

13. The method according to claim 1, where in said installing of said equipment components in said fuselage section respectively in said equipping zone and said installing of said outfitting components in said outfitting zone are carried out substantially simultaneously with each other.

14. The method according to claim 1, wherein said equipping zone has a length corresponding to an axial length of one of said fuselage sections, and said steps of moving said fuselage sections comprise moving said fuselage sections respectively one process step distance corresponding to said axial length.

15. The method according to claim 1, wherein each said fuselage section comprises a plurality of fuselage subsections that are joined to each other along respective transverse circumferential seams in said riveting zone using said automatic riveting machine.

16. The method according to claim 1, wherein said zones immediately adjoin one another along an axis of said fuselage sections.

17. A system for fabricating, equipping and outfitting at least a plurality of sections of an aircraft fuselage, comprising:

an assembly station including a riveting zone having an automatic riveting machine therein, an equipping zone directly adjoining said riveting zone, and an outfitting zone directly adjoining said equipping zone; and a partially assembled aircraft fuselage that includes plural fuselage sections joined to each other, and that is located in said assembly station;

wherein at least one first fuselage section of said plural fuselage sections is located in said outfitting zone, at least one second fuselage section of said plural fuselage sections is located in said equipping zone, and at least one third fuselage section of said plural fuselage sections is located in said riveting zone;

wherein said first fuselage section contains equipment components and outfitting components installed therein, said second fuselage section contains equipment components and does not contain outfitting components installed therein, and said third fuselage section does not contain equipment components and does not contain outfitting components installed therein; and wherein said assembly station has dimensions large enough to receive said partially assembled aircraft fuselage therein, and each one of said zones respectively individually has dimensions that are large enough to receive said at least one of said fuselage sections respectively therein and are too small to receive all of said partially assembled aircraft fuselage therein.

18. The system according to claim 17, wherein said equipment components comprise components selected from pipes, hoses, conduits, ducts, pumps, blowers, electrical devices, pneumatic devices, hydraulic devices, airframe structural components, and cabin structural components, and wherein said outfitting components comprise components selected from insulation blankets, insulation packets, electrical conductors and cables, wall panels, floor decks, mounting hardware and fittings, trim components, seats, baggage compartments, and light fixtures.

19. The system according to claim 17, wherein said dimensions of said assembly station are only large enough to accommodate one complete aircraft fuselage that is finished from said partially assembled aircraft fuselage therein.

20. The system according to claim 17, wherein said dimensions of each one of said zones are respectively only large enough to receive a single one of said fuselage sections therein.

21. The system according to claim 17, wherein said automatic riveting machine comprises an orbital riveting apparatus that is movable around an exterior of said third fuselage section in said riveting zone and a riveting robot that is movable inside of said third fuselage section in said riveting zone.

22. The system according to claim 17, further comprising a safety screening divider arranged between said riveting zone and said equipping zone.

23. The system according to claim 17, further comprising a carriage system supporting said first, second and third fuselage sections respectively in said zones, for moving said fuselage sections successively stepwise into said riveting zone, said equipping zone and said outfitting zone.

24. A system for fabricating, equipping and outfitting at least a segment of an aircraft fuselage including an initial structure and first, second and third fuselage sections, said system comprising an assembly area including a riveting zone having an automatic riveting machine, an equipping zone and an outfitting zone, first means for moving said fuselage sections among said zones, and second means for installing equipment components and outfitting components into said fuselage sections, wherein said first means are for moving said first fuselage section into said riveting zone, and said automatic riveting machine is for joining said first fuselage section onto said initial structure in said riveting zone, wherein said first means are further for moving said first fuselage section and said initial structure in common so that said first fuselage section is moved from said riveting zone into said equipping zone, wherein said first means are further for moving said second fuselage section into said riveting zone, and said automatic riveting machine is further for joining said second fuselage section onto said first fuselage section in said riveting zone, wherein said second means are further for installing equipment components into said first fuselage section in said equipping zone, wherein said first means are further for moving said first fuselage section and said second fuselage section in common so that said first fuselage section is moved from said equipping zone into said outfitting zone and said second fuselage section is moved from said riveting zone into said equipping zone, wherein said first means are further for moving said third fuselage section into said riveting zone, and said automatic riveting machine is further for joining said third fuselage section onto said second fuselage section in said riveting zone, wherein said second means are further for installing equipment components into said second fuselage section in said equipping zone and for installing outfitting components into said first fuselage section in said outfitting zone, and wherein said first means are further for moving said first, second and third fuselage sections in common so that said second fuselage section is moved from said equipping zone into said outfitting zone and said third fuselage section is moved from said riveting zone into said equipping zone.

* * * * *